United States Patent
Liu

(10) Patent No.: US 9,639,617 B2
(45) Date of Patent: *May 2, 2017

(54) NAVIGATION SYSTEM WITH DATA DRIVEN CATEGORY LABEL CREATION MECHANISM AND METHOD OF OPERATION THEREOF

(71) Applicant: TeleNav, Inc., Sunnyvale, CA (US)

(72) Inventor: Winston Yonglong Liu, San Jose, CA (US)

(73) Assignee: Telenav, Inc., Santa Clara, CA (US)

( * ) Notice: Subject to any disclaimer, the term of this patent is extended or adjusted under 35 U.S.C. 154(b) by 187 days.

This patent is subject to a terminal disclaimer.

(21) Appl. No.: 13/775,362

(22) Filed: Feb. 25, 2013

(65) Prior Publication Data

US 2014/0244651 A1 Aug. 28, 2014

(51) Int. Cl.
*G06F 17/30* (2006.01)
*G01C 21/36* (2006.01)

(52) U.S. Cl.
CPC ..... *G06F 17/3087* (2013.01); *G01C 21/3685* (2013.01); *G06F 17/30023* (2013.01); *G06F 17/3053* (2013.01); *G06F 17/30477* (2013.01); *G06F 17/30864* (2013.01); *G06F 17/30873* (2013.01)

(58) Field of Classification Search
CPC .... G06F 17/30; G06F 15/16; G06F 17/30958; G06F 17/30864; G06F 17/3087; G06F 17/30675; G06F 17/30696; G06F 17/30867; G01C 21/30; G01C 21/32; G09B 29/007; G06Q 30/02
USPC ........ 707/705–710, 722–723, 727–731, 748, 707/752, 754, 765–768, 769–770; 455/414.1, 412.1, 550.1; 715/781, 786, 715/835; 709/203, 206
See application file for complete search history.

(56) References Cited

U.S. PATENT DOCUMENTS

| | | | |
|---|---|---|---|
| 6,775,537 B1 * | 8/2004 | Panichkul et al. | 455/414.1 |
| 7,155,339 B2 | 12/2006 | Tu | |
| 7,272,489 B2 | 9/2007 | Tu | |
| 7,707,140 B2 | 4/2010 | Leishman et al. | |
| 7,725,526 B1 * | 5/2010 | Kraft | 709/203 |
| 8,165,798 B2 | 4/2012 | Woo | |
| 8,224,565 B2 | 7/2012 | Chang | |

(Continued)

FOREIGN PATENT DOCUMENTS

| WO | WO 01/57731 | * | 8/2001 |
|---|---|---|---|
| WO | 2010/072258 | * | 7/2010 |

OTHER PUBLICATIONS

Rodrigues et al., "Automatic Classification of Points-of-Interest for Land-use Analysis," GEOProcessing 2012 : The Fourth International Conference on Advanced Geographic Information Systems, Applications, and Services.

*Primary Examiner* — Srirama Channavajjala
(74) *Attorney, Agent, or Firm* — IP Investment Law Group

(57) ABSTRACT

A method of operation of a navigation system comprising: storing information including to a plurality of search query; counting each of the plurality of search query stored; ranking each of the plurality of search query based upon an aggregate count of each of the plurality of search query stored; identifying a category label based upon the ranking associated with each of the plurality of search query; and updating a category label list for displaying on a device.

20 Claims, 13 Drawing Sheets

(56) References Cited

U.S. PATENT DOCUMENTS

| | | | |
|---|---|---|---|
| 8,306,729 B2* | 11/2012 | Liu | 701/400 |
| 8,566,029 B1* | 10/2013 | Lopatenko et al. | 701/426 |
| 8,577,610 B2* | 11/2013 | Shao et al. | 701/537 |
| 8,645,235 B2* | 2/2014 | Ridgeway | 705/30 |
| 2006/0074547 A1* | 4/2006 | Kaufman et al. | 701/200 |
| 2007/0124286 A1* | 5/2007 | Van Der Linden | 707/3 |
| 2008/0076451 A1* | 3/2008 | Sheha et al. | 455/456.3 |
| 2009/0299964 A1* | 12/2009 | Cameron | G06F 17/30864 |
| 2010/0114908 A1* | 5/2010 | Chand et al. | 707/748 |
| 2010/0168996 A1* | 7/2010 | Bourque | G01C 21/3611 701/532 |
| 2010/0185649 A1* | 7/2010 | Zhou et al. | 707/769 |
| 2010/0306211 A1* | 12/2010 | Chaudhuri et al. | 707/759 |
| 2010/0306229 A1* | 12/2010 | Timm | G06F 17/3064 707/767 |
| 2011/0238288 A1* | 9/2011 | Li et al. | 701/201 |
| 2011/0313657 A1* | 12/2011 | Myllymaki | G01C 21/3682 701/438 |
| 2012/0209861 A1* | 8/2012 | Narasimha et al. | 707/750 |
| 2013/0018574 A1* | 1/2013 | Adler | G01C 21/3492 701/408 |

* cited by examiner ns and, thus, solutions to these problems have long eluded those skilled in the art.

DISCLOSURE OF THE INVENTION

The present invention provides a method of operation of a navigation system comprising: storing information including to a plurality of search query; counting each of the plurality of search query stored; ranking each of the plurality of search query based upon an aggregate count of each of the plurality of search query stored; identifying a category label based upon the ranking associated with each of the plurality of search query; and updating a category label list for displaying on a device.

NAVIGATION SYSTEM WITH DATA DRIVEN CATEGORY LABEL CREATION MECHANISM AND METHOD OF OPERATION THEREOF

TECHNICAL FIELD

The present invention relates generally to a navigation system, and more particularly to a system relating to category labels.

BACKGROUND ART

Modern portable consumer and industrial electronics, especially client devices such as navigation systems, cellular phones, portable digital assistants, and combination devices are providing increasing levels of functionality to support modern life including location-based information services. Research and development in providing location-based technologies, and their associated search technologies, on a wide range of portable and mobile devices can take a myriad of different directions.

Location based services and location based search services allow users to create, transfer, store, and/or consume information in order for users to create, transfer, store, and consume in the "real world". One such use of location based services is to efficiently transfer or route users to the desired destination or service based on search queries.

Navigation systems, location based services, and search services, enabled systems have been incorporated in automobiles, notebooks, handheld devices, and other portable products. Today, these systems aid users by incorporating available, real-time relevant information, such as maps, directions, local businesses, or other points of interest (POI). The real-time information and search capability provides invaluable relevant information. At the same time, road systems around the world have become more complex, with surface, elevated, or underground road systems to ease traffic congestion on surface roads.

Thus, a need still remains for a navigation system with improved search and information organization capability that provides current and updated information when a user enters a search query or search entry into a navigation system. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

The present invention provides a navigation system, including: a storage module for including a plurality of search query received, coupled to a counting module, for counting each of the plurality of search query stored, a ranking module, coupled to the counting module, for ranking each of the plurality of search query based upon an aggregate count of each of the plurality of search query, an identification module, coupled to the ranking module, for identifying a category label based upon the ranking associated with each of the plurality of search query, and an update module, coupled to the identification module for updating a category label list for displaying on a device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
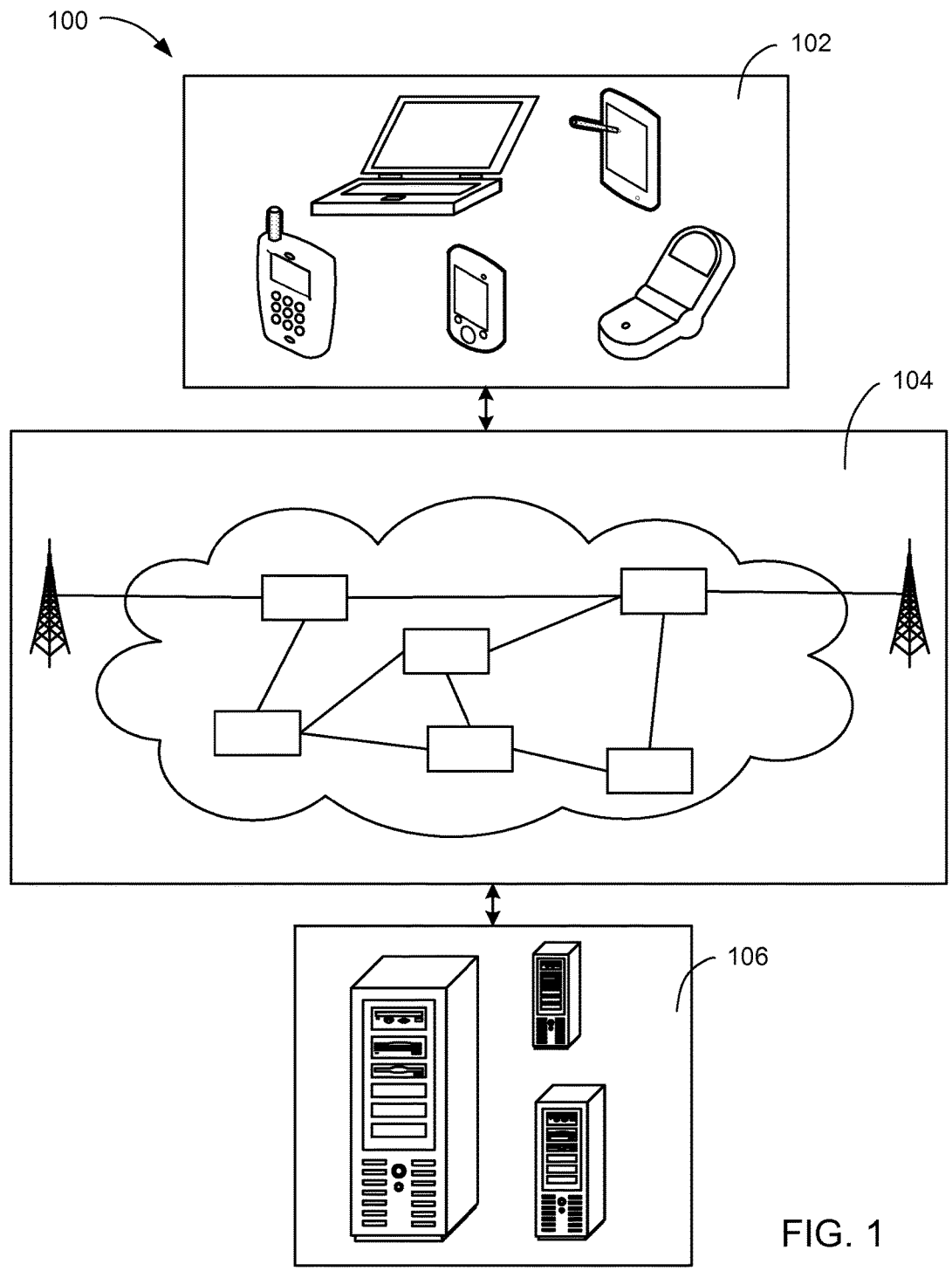
FIG. 1 is a navigation system with a data driven category label creation mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information can be presented in the format of (X, Y), where X and Y are two ordinates that define the geographic location, i.e., a position of a user.

In an alternative embodiment, navigation information can be presented by longitude and latitude related information. In a further embodiment of the present invention, the navigation information can include a velocity element including a speed component and a heading component.

The term "relevant information" referred to herein comprises the navigation information described as well as information relating to points of interest to the user, such as local business, hours of operations, types of businesses, advertised specials, traffic information, maps, local events, and nearby community or personal information.

The term "module" referred to herein refers to software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

The term "search query" referred to herein can include input to a navigational system. Such input can be made through a keyboard, touch screen, other manual mechanism, voice command, computer software and hardware, other electronic mechanism, and any combination thereof.

Referring now to FIG. 1, therein is shown a navigation system 100 with a data driven category label creation mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
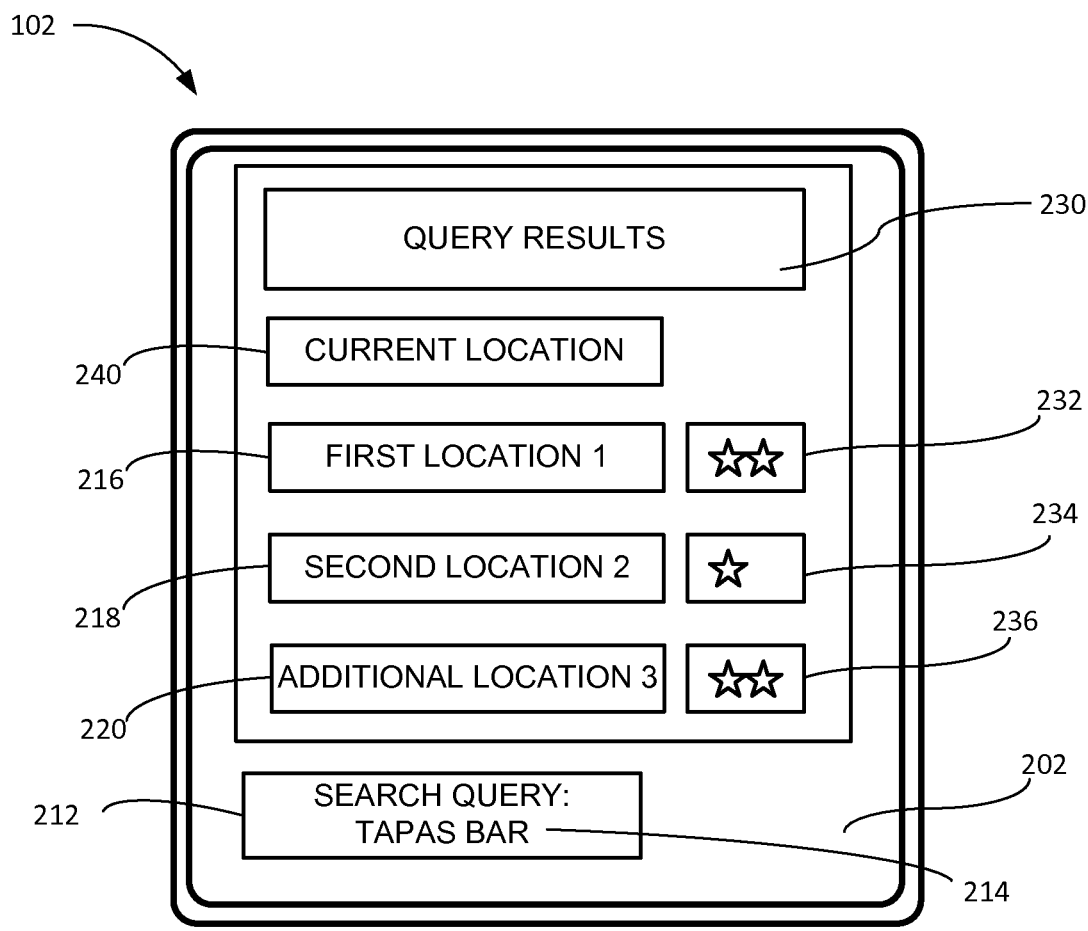
FIG. 2 shows a first example of a data driven category label creation mechanism shown on a display of the navigation system.

Referring now to FIG. 2, therein is shown a first example of a display interface 202 of the first device 102 of the navigation system 100. In this example, the figure depicts a display interface 202 which includes a search query 212, with a specific entry 214 received by the first device 102. The search query 212 can be input into the first device 102.

Such input can be made by a user through a manual mechanism, an electronic mechanism, an oral command, a voice recognition system, a navigation system, or a combination thereof. For a specific example, the entry 214 can be "TAPAS BAR." The display interface 202 can provide query results 230, which can include a first location 216 that matches the search the specific entry 214, a second location 218 that matches the specific entry 214, or an additional location 220 that also matches the specific entry 213. The query results 230 can be also be dependent upon a current location 240 of the first device 102.

The display interface 202 of the first device 102 of the navigation system 100 can also provide other information, such as a first customer rating 232 for the first location 216, a second customer rating 234 for the second location 218, and an additional customer rating 236 for the additional location 220. The display interface 202 can allow a user to select a specific query result, such as the second location, 218. The navigation system 100 can then provide further routing, destination, and other relevant information of the selected second location 218. The display interface 202 can also provide additional information on the query results 230.

Figure 3:
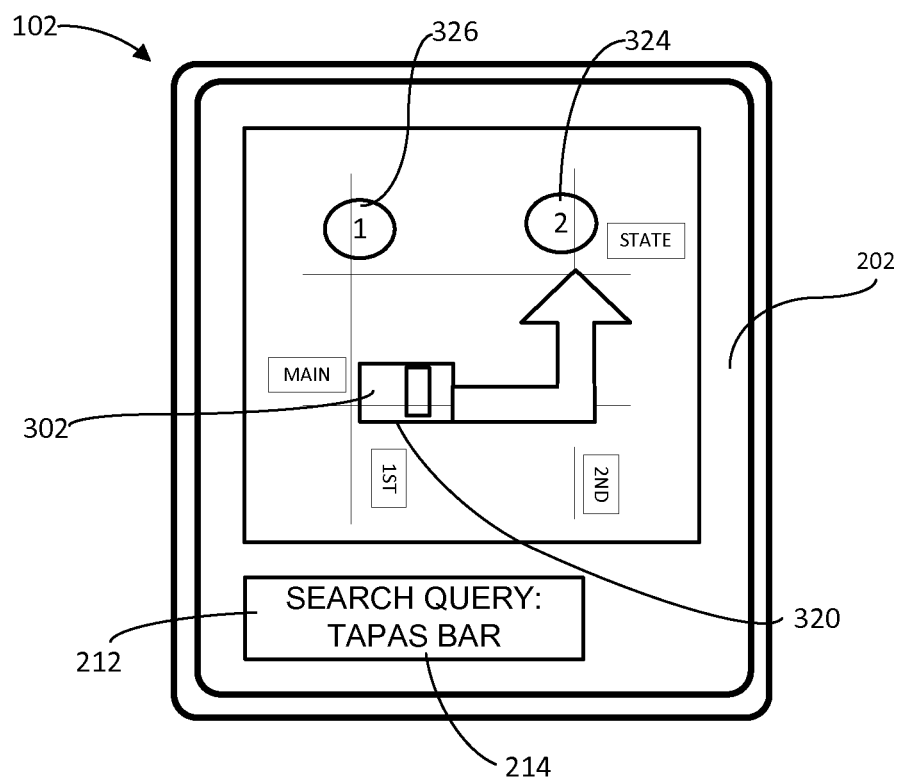
FIG. 3 shows a second example of a data driven category label creation mechanism, with destination information, shown on the display of the navigation system.

Referring now to FIG. 3, therein is shown a second example of the display interface 202 of the first device 102 of a navigation system 100. In this example, the figure depicts a display interface 202 with search query 212, and a specific entry 214 of "TAPAS BAR" received by the first device 102. A user can select a location provided by the query results 230 based on the specific entry 214 of "TAPAS BAR." The display interface 202 then shows the current location 302 of the navigation system 100 of a vehicle 320. The display interface 202 can also provide route information for arriving at a selected location 324 from the current location 302. It can also provide an alternative location 326 on the display interface 202. The information displayed on the display interface 202 can be updated or configurable so that other characteristics of the query results 230 can be provided. The concurrent display of the customer rating 232 of FIG. 2 for the current location 302, route information, for arriving at the selected location 324, and the alternative location 326 from the category label list can provide the user with a next best choice if the selected location 324 does not satisfy the user.

Figure 4:
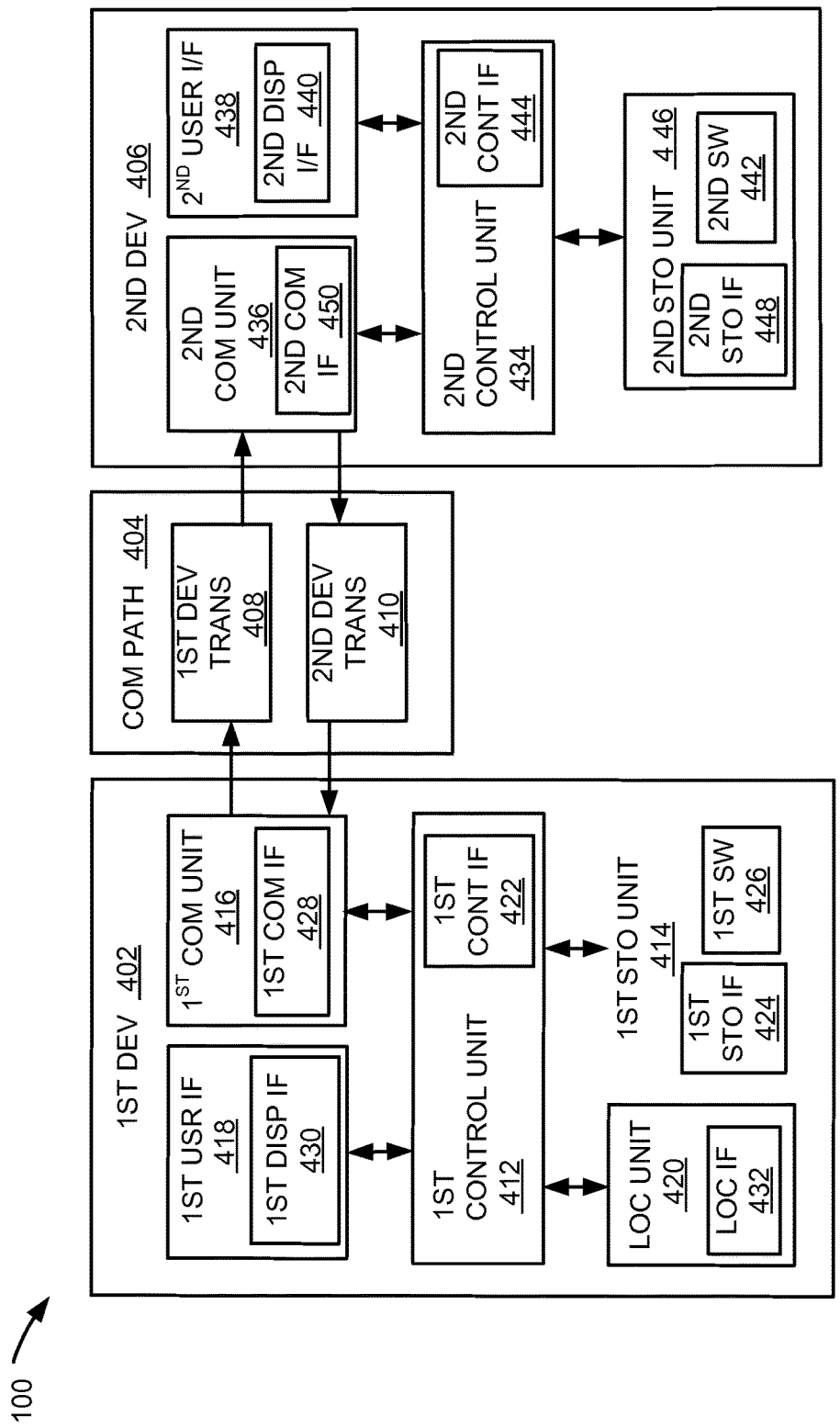
FIG. 4 shows an exemplary block diagram of the navigation system.

Referring now to FIG. 4, therein is shown an exemplary block diagram of the navigation system 100. The navigation system 100 can include the first device 102, the communication path 104, and the second device 106. The first device 102 can send information in a first device transmission 408 over the communication path 104 to the second device 106. The second device 106 can send information in a second device transmission 410 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 412, a first storage unit 414, a first communication unit 416, a first user interface 418, and a location unit 420. The first device 102 can be similarly described by the first device 102.

The first control unit 412 can include a first control interface 422. The first control unit 412 can execute a first software 426 to provide the intelligence of the navigation system 100. The first control unit 412 can be implemented in a number of different manners. For example, the first control unit 412 can be a processor, an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations external to the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The location unit 420 can generate location information, current heading, and current speed of the first device 102, as examples. The location unit 420 can be implemented in many ways. For example, the location unit 420 can function as at least a part of a global positioning system (GPS), an inertial navigation system, a cellular-tower location system, a pressure location system, or any combination thereof.

The location unit 420 can include a location interface 432. The location interface 432 can be used for communication between the location unit 420 and other functional units in the first device 102. The location interface 432 can also be used for communication that is external to the first device 102.

The location interface 432 can receive information from the other functional units or from external sources, or can transmit information to the other functional units or to external destinations. The external sources and the external destinations refer to sources and destinations external to the first device 102.

The location interface 432 can include different implementations depending on which functional units or external units are being interfaced with the location unit 420. The location interface 432 can be implemented with technologies and techniques similar to the implementation of the first control interface 422.

The first storage unit 414 can store the first software 426. The first storage unit 414 can also store the relevant information, such as advertisements, points of interest (POI), navigation routing entries, or any combination thereof.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between the location unit 420 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations external to the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106 of FIG. 1, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, or any combination thereof to provide data and communication inputs.

The first user interface 418 can include a first display interface 430. The first display interface 430 can include a display, a projector, a video screen, a speaker, or any combination thereof.

The first control unit 412 can operate the first user interface 418 to display information generated by the navigation system 100. The first control unit 412 can also execute the first software 426 for the other functions of the navigation system 100, including receiving location information from the location unit 420. The first control unit 412 can further execute the first software 426 for interaction with the communication path 104 via the first communication unit 416.

The second device 106 can be optimized for implementing the present invention in a multiple device embodiment with the first device 102. The second device 106 can provide the additional or higher performance processing power compared to the first device 102. The second device 106 can include a second control unit 434, a second communication unit 436, and a second user interface 438.

The second user interface 438 allows a user (not shown) to interface and interact with the second device 106. The second user interface 438 can include an input device and an output device. Examples of the input device of the second user interface 438 can include a keypad, a touchpad, soft-keys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 106 of the navigation system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the navigation system 100, including operating the second communication unit 436 to communicate with the first device 102 over the communication path 104.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second controller interface 444. The second controller interface 444 can be used for communication between the second control unit 434 and other functional units in the second device 106. The second controller interface 444 can also be used for communication that is external to the second device 106.

The second controller interface 444 can receive information from the other functional units or from external sources, or can transmit information to the other functional units or to external destinations. The external sources and the external destinations refer to sources and destinations external to the second device 106.

The second controller interface 444 can be implemented in different ways and can include different implementations depending on which functional units or external units are being interfaced with the second controller interface 444. For example, the second controller interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 100 is shown with the second storage unit 446 as a single hierarchy storage system, although it is understood that the navigation system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the location unit 420 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations external to the second device 106.

The second storage interface 448 can include different implementations depending on which functional units or external units are being interfaced with the second storage unit 446. The second storage interface 448 can be implemented with technologies and techniques similar to the implementation of the second controller interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second controller interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The navigation system 100 can be executed by the first control unit 412, the second control unit 434, or a combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 420, although it is understood that the second device 106 can also operate the location unit 420.

Figure 5:
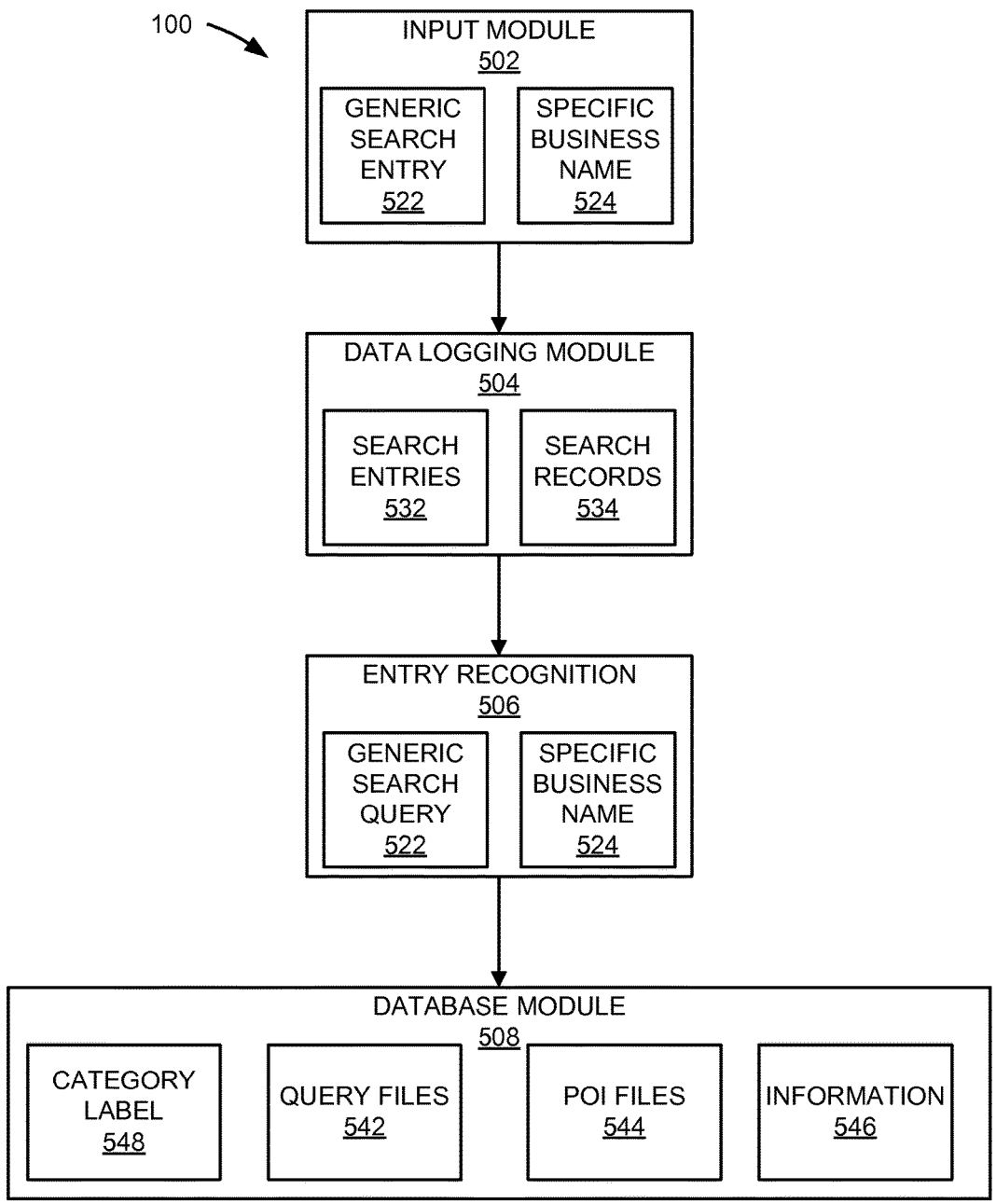
FIG. 5 shows a control flow of a search query storage mechanism of the navigation system.

Referring now to FIG. 5, therein is shown a control flow of a search query storage mechanism of the first device 102. The navigation system 100 can include an input module 502. The input module 502 receives the search query 212 of FIG. 2. The data in the input module 502 can be from a user, a search engine, the navigation system, an electronic system, a manual system, or a combination thereof. The input module 502 can receive different forms or types of entries for the search query 212. For example, the search query 212 can include a generic search query 522 or a specific business name 524. A generic search query 522 is defined as a general term that describes a point of interest by location or by activities being conducted at a location. An example of a generic search query 522 can be "restaurant" or "gas station." Additional examples of generic search query 522 would be "book stores" or "park." The input module 502 can also receive a specific business name, such as "Chevron."

The input module 502 is coupled to a data logging module 504, which saves various search entries 532 or search records 534. The data logging module 504 is coupled to an entry recognition module 506. The data logging module 504 saves the search entries 532 and the search records 534 for identification by the entry recognition module 506. The purpose of the entry recognition module 506 is for determining the search query 212 as the generic search query 522 or the specific business name 524. If the search entry 212 input is the generic search query 522, it is stored in query files 542 in the database module 508. If the search query 212 is the specific business name 524, the search query 212 can be stored in POI files 544 in the database module 508. The information in the database module 508 can be processed or organized on a real-time basis, in batch modes, or on a periodic basis automatically. The search entries 532 or the search records 534 can be separated into query files 542 or POI files 544. The database module can also be used to store category label 548 and information 546.

Figure 6:
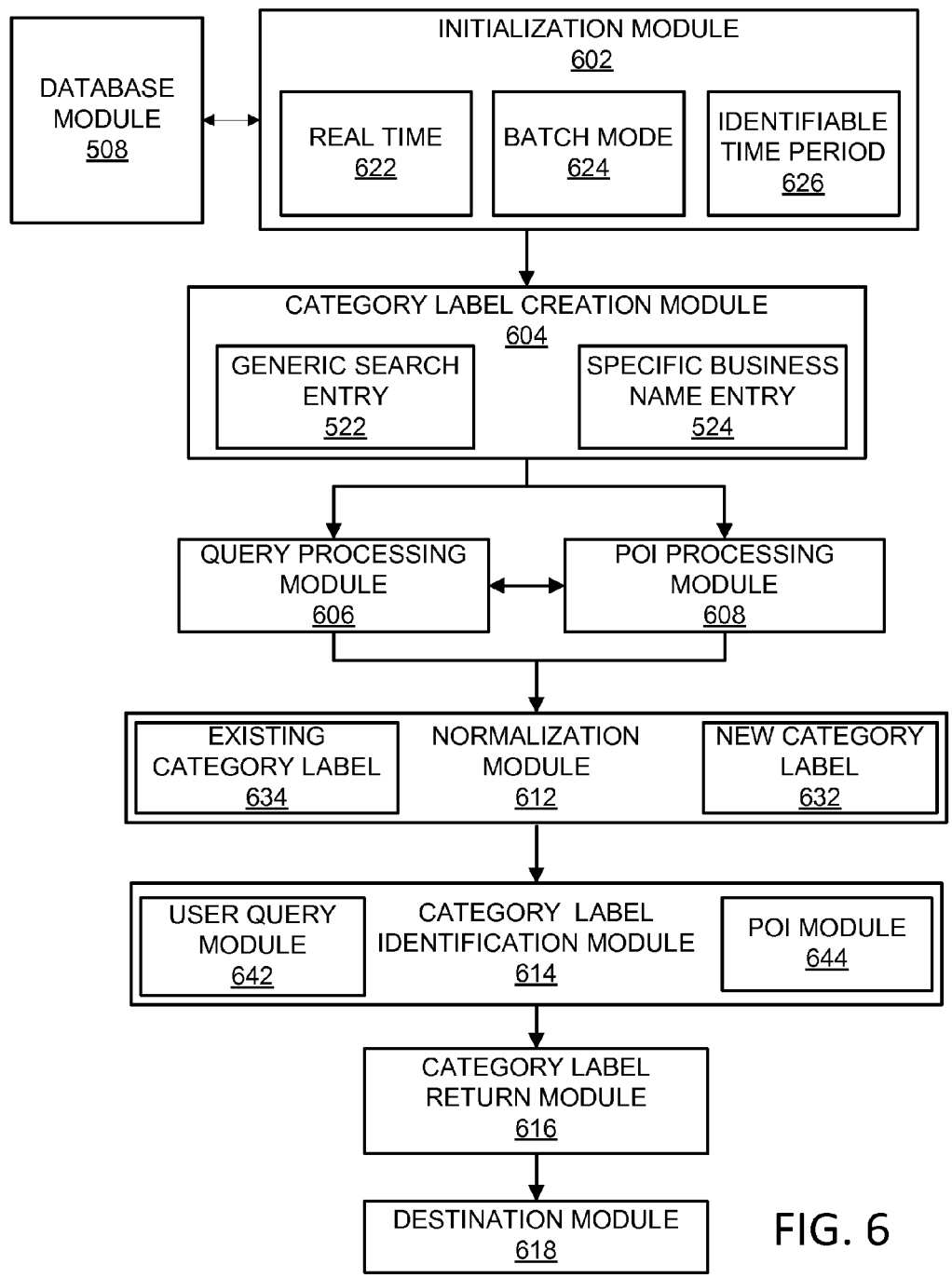
FIG. 6 shows a control flow of a data driven category label creation mechanism of the navigation system.

Referring now to FIG. 6, therein is shown a control flow of a data driven category label creation mechanism of the first device 102 of the navigational system 100. The data driven category label creation mechanism uses the information 546 stored in the database module 508 of FIG. 5. The control flow can also be implemented in the first device 102 of FIG. 1 or the second device 106 of FIG. 1. The control flow includes an initialization module 602. The purpose of the initialization module 602, which is coupled to a category label creation module 604, is to invoke the category label creation module 604. The invocation of the category label creation module 604 by the initialization module 602, can be done real time 622 or in a batch mode 624. The initialization module 602 can start a process for creating new category labels 632 and updating existing category labels 634 automatically using an identifiable time period 626 set by a user.

The category label creation module 604 is coupled to a query processing module 606 and a POI processing module 608. The category label creation module 604 determines if the next processing module should be performed by the query processing module 606 or the POI processing module 608. To create new category labels from generic search entries 522, the query processing module 606 will be invoked. The query processing module 604 uses data from users saved in search logs to create new category labels 632. To create new POI from the specific business name entries 524, the POI processing module 608 can be invoked.

The query processing module 606 can process a generic search query 522, such as "coffee shops" or "restaurants." The POI processing module 608 can process the input of a specific business name, such as a hotel chain. The query processing module 606 is coupled to a normalization module 612, and the POI processing module 608 is also coupled to the normalization module 612.

The purpose of the normalization module 612 is to identify similar or same search entries 532 or search records 534 of FIG. 5. The normalization module 612 compares two entries and determines if they are identical. If the entries are not identical, the normalization module 612 checks if they are linked to the same POI by using existing information 546 stored in the database module 508. For example, the normalization module 612 can identify the term "Kentucky Fried Chicken" and the term "KFC," and treat the two terms as the same POI name.

The normalization module 612 is coupled to a category label identification module 614. The purpose of the category label identification module 614 is to identify search entries 532 or search records 534 of FIG. 5 that has been already in existence by comparing to information in the database module 508 as a category label 548. For example, if the search query 212, "coffee shop" is a popular or frequently entered search query but is already an existing category label 634, no new category label will be created. On the other hand, if "tapas bar" is a popular search query 212 and is not in existence yet, a new category label 632 for "tapas bar" can be created.

The new category label identification module 614 is coupled to a category label return module 616. The purpose of the category label identification module 614 is to check existing category labels and determine any new category label should be created. The category label return module 616 can provide new category labels. The category label return module 616 can also delete a category label or multiple category labels that have not been used for a particular period time. The category label identification module 614 can track the time at which a category label was last searched. The category labels can be updated periodically or within an identifiable time period 626 based upon the data received from users. If a category label has not been used for a period of time, it can be deleted.

A new category label 632 can be created if a popular entry is not an existing category label 634. The category label return module 616 is coupled to a destination module 618, which can provide routing, location, customer review, or any combination thereof and other information and results based on the search query 212.

The category label identification module 614 determines when a new category label 632 should be created. The category label identification module includes a user query module 642 and a POI module 644.

The purpose of the user query module 642 is to recognize a generic search query 522 by determining its meaning and to generate a new category label for the generic search query 212. The purpose of the POI module 644 is to identify a specific business name entry 524 and to generate a new POI category label for the specific business name entry.

Figure 7:
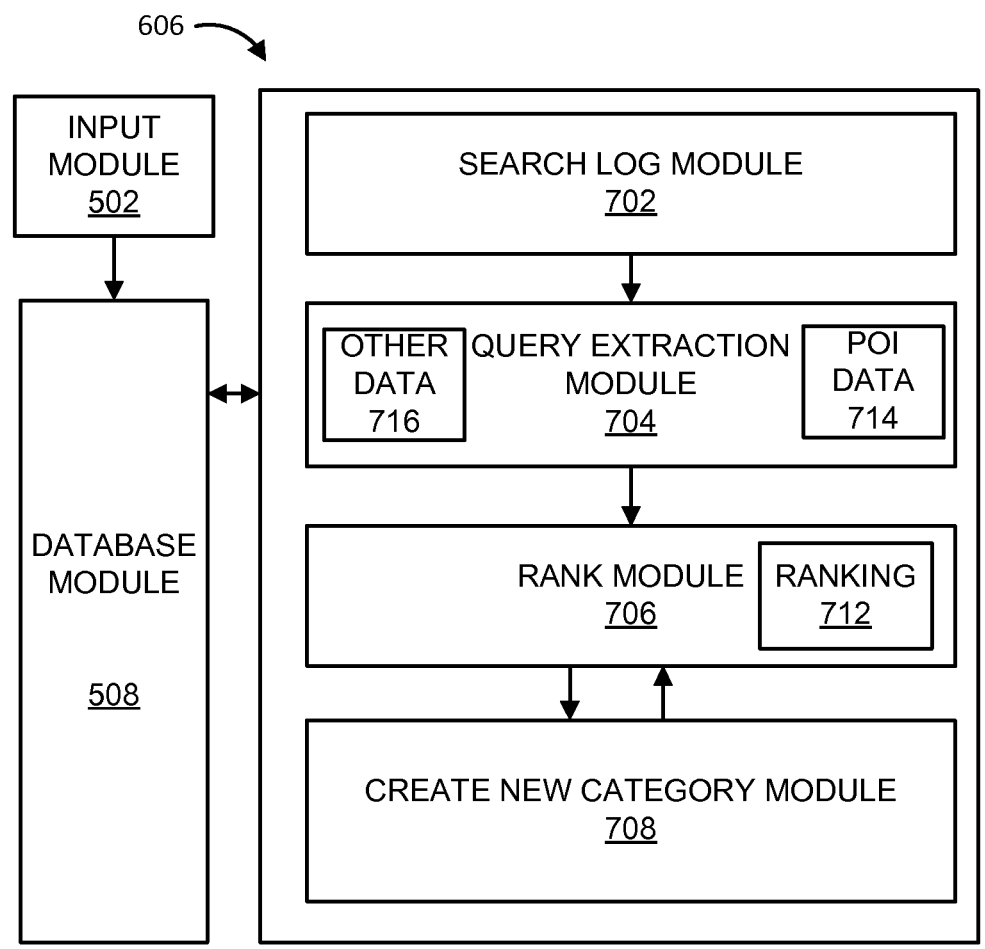
FIG. 7 shows a control flow of a query processing module of the navigation system.

Referring now to FIG. 7, therein is shown a control flow of the query processing module 606 in FIG. 6. The query processing module 606 includes a search log module 702 which is coupled to a query extraction module 704. The search log module 702 gathers all user queries using generic search entries 522 from the database module 508. The purpose of the search log module 702 is to retrieve relevant data from the database module 508.

The search log module 702 is coupled to query extraction module 704. The query extraction module 704 is coupled to the database module 508. The query extraction module 704 extracts POI data 714 and other data 716 from query files 542 in the database module 508. The data can be gathered from user logs, search engines logs, and other data logging mechanisms. The query extraction module 704 counts each search query 212. The rank module 706 finds popular or frequently searched queries. The query extraction module 704 is coupled to a rank module 706.

The purpose of the rank module 706 is to identify popular or frequently searched queries. The search queries are organized in an order of ranking 712 associated with the number of times a search query is entered. The number of top or popular queries from counting to be ranked or organized can be configurable and can change over time. The rank module 706 is coupled to a create new category module 708. If a top or frequently searched query is not an existing category, a new category label will be created by the create new category module 708.

Figure 8:
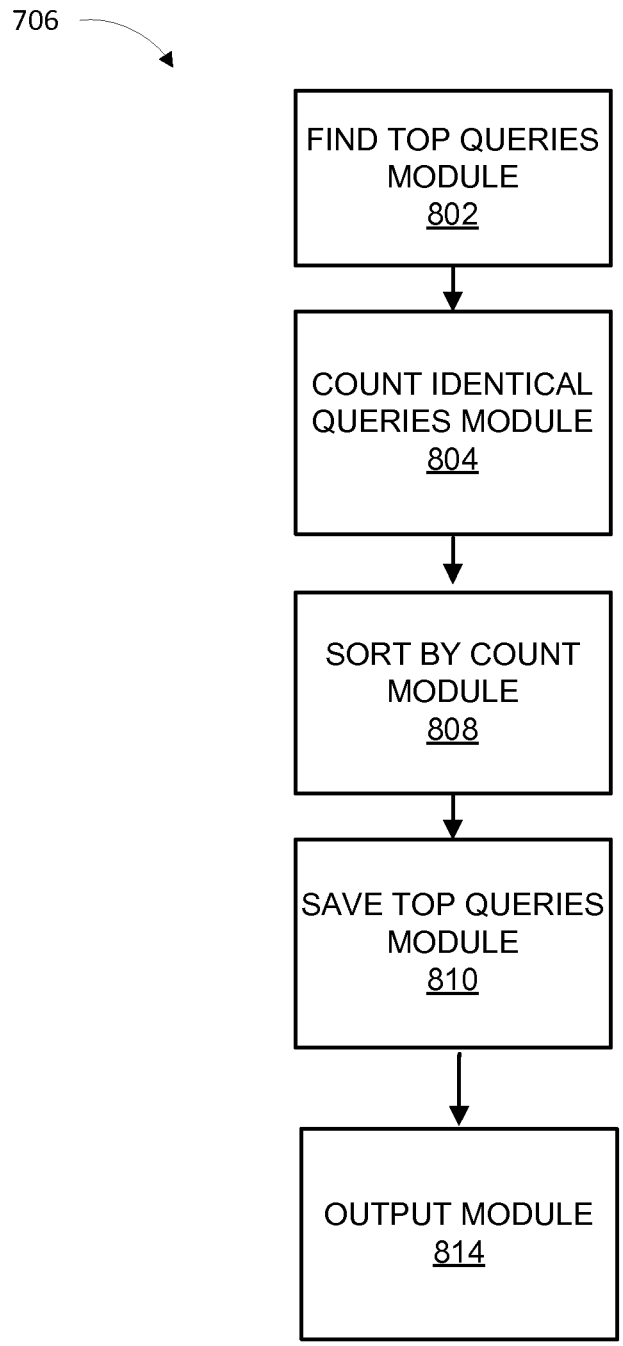
FIG. 8 shows a control flow of a rank module of the navigation system.

Referring now to FIG. 8, therein is shown a control flow of the rank module 706 of the first device of the navigation system 100. The rank module 706 includes a find top queries module 802, which is coupled to a count identical queries module 804. The find top queries module 802 which identifies the queries that have been entered by a user into a search engine on a pre-determined periodic basis.

The count identical queries module 804 identifies distinct queries by comparing if a query is identical to a previously searched query. The count identical queries module 804 can also combine identical queries and count each occurrence of a query. The count identical queries module 804 can find popular and frequently searched queries which are the queries with higher counts.

The count identical queries module 804 is coupled to a sort by POI count module 808. The purpose of the sort by count module 808 is to sort the top queries in an order from the most frequently searched to the least frequently searched entries.

The sort by POI count module 808 is coupled to a save top queries module 810. The save top queries module 810 stores popular, top, or frequently searched queries. The range of or number of top queries stored can be configurable and can change over time.

The top queries module 810 is coupled to an output module 814. The output module 814 provides the specified top or popular queries.

Figure 9:
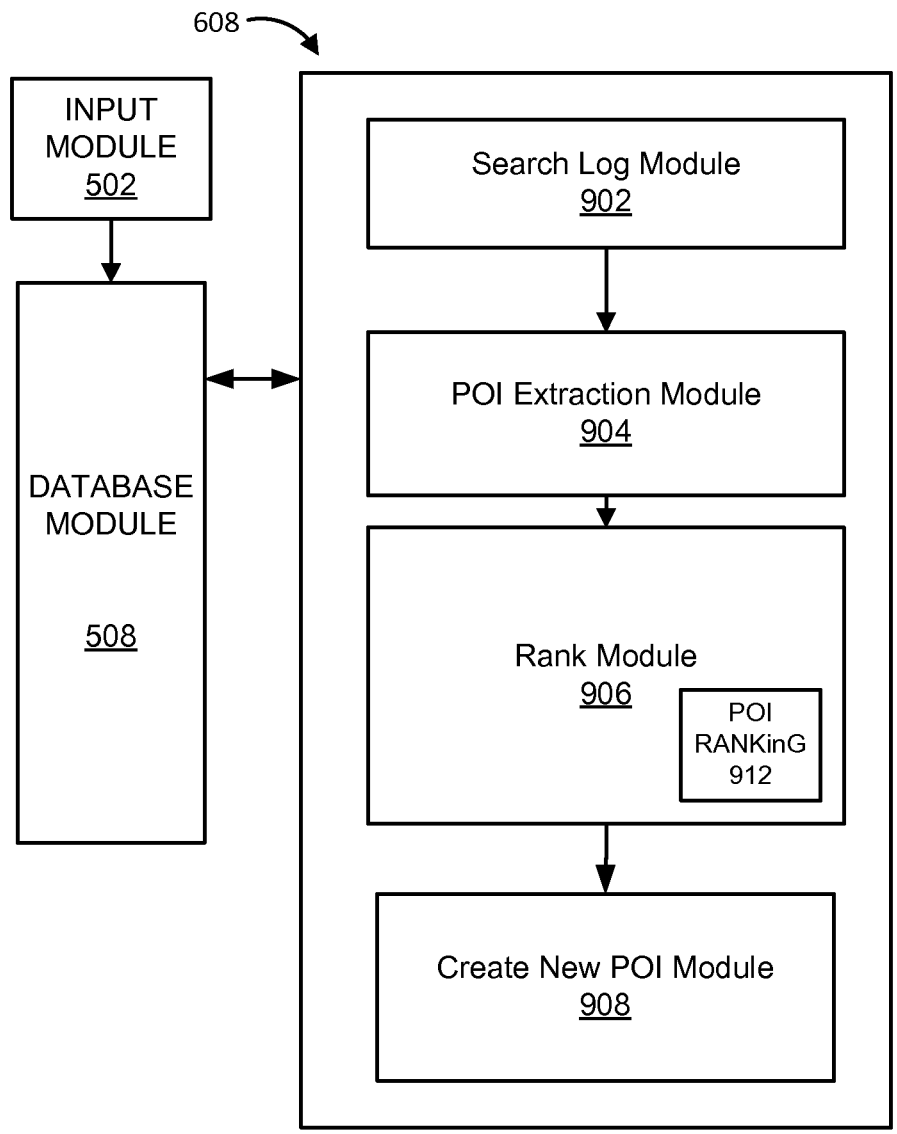
FIG. 9 shows a control flow of a POI processing module of the navigation system.

Referring now to FIG. 9, therein is shown a control flow of the POI processing module 608 in FIG. 6. The POI processing module 608 includes a search log module 902. The search log module 902 is coupled to the POI extraction module 904. The POI extraction module is coupled to the database module 508, which receives input from the input module 502. The search log module 902 saves user query using specific business name. The purpose of the search log module 902 is to save data from query entries 212, such as the query entry and the time at which the query was performed.

The POI extraction module 904 extracts specific business names from user logs, search engines logs, and other data logging mechanism through the POI files 544 in the database module 508. The POI extraction module 904 counts each search queries, which are specific business names, entered into the navigation system 100.

The POI extraction module 904 is coupled to the rank module 906. The specific business names searched are organized in an order of ranking 912 associated with the number of times a search query is received. The number of top or popular POI names to be ranked or organized can be configurable and can change over time.

The rank module 906 is coupled to a create new POI module 908. If a top or popular specific business name is not an existing POI, a new POI will be created by a create new POI module 908.

Figure 10:
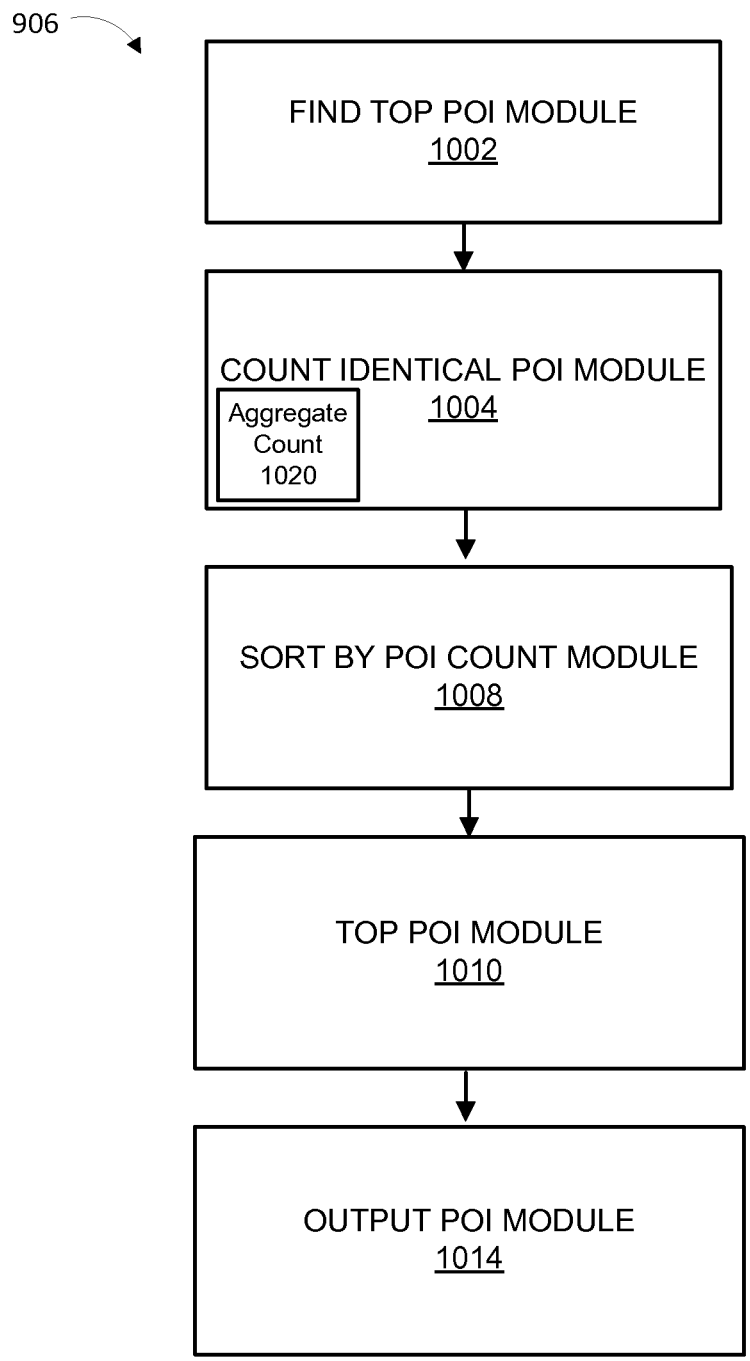
FIG. 10 shows a control flow of a rank module for POI names of the navigation system.

Referring now to FIG. 10, therein is shown a control flow of the rank module 906 of the navigation system 100. The rank module 906 includes a find top POI module 1002, which is coupled to a count identical POI module 1004. The find top POI module 1002 identifies the specific business names that have been received from a user or from a search engine.

The find top POI module 1002 is coupled to a count identical POI module 1004. The count identical POI module 1004 identifies distinct business names by comparing a business names with previously searched business names. The count identical POI module 1004 then combine identical business names if it has been previously searched. Then, the count identical POI module 1004 counts each occurrence of a query and stores an aggregate count 1020

The count identical POI module 1004 is coupled to a sort by count module 1008. The purpose of the sort by POI count module 1008 is to sort the top business names searched in an order from the most frequently searched to the least frequently searched entries.

The sort by POI count module 1008 is coupled to a top POI module 1010. The top POI module 1010 saves popular, top, or frequently searched entries. The range of top business names saved can be configurable and can change over time.

The top POI module 1010 is coupled to a POI output module 1014, which provides a specified top or popular business names.

Figure 11:
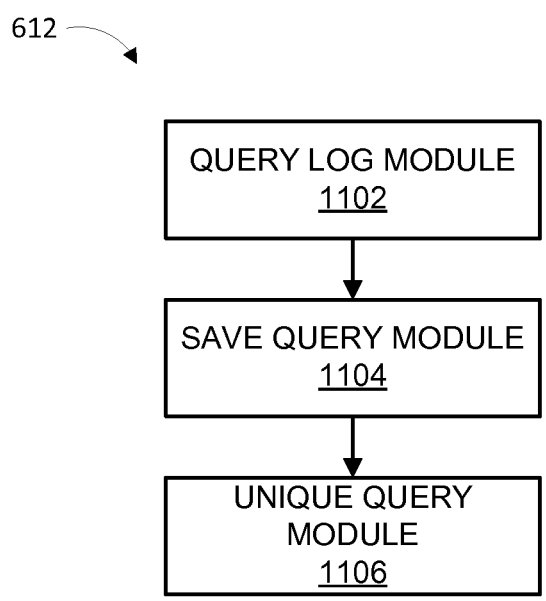
FIG. 11 shows a control flow of a normalization module of the navigation system.

Referring now to FIG. 11 therein is shown a control flow of the normalization module 612 of the navigation system 100. The normalization module 612 includes a query log module 1102, which loads all queries that have been logged.

The query log module 1102 is coupled to save unique query module 1104. The save unique query module 1104 saves distinct queries entered into the navigation system 100.

The save unique query module 1104 is coupled to a unique query module 1106. The purpose of the unique query module 1106 is to count distinct queries or business names received. The unique query module 1106 also combines duplicate queries or business names received.

Figure 12:
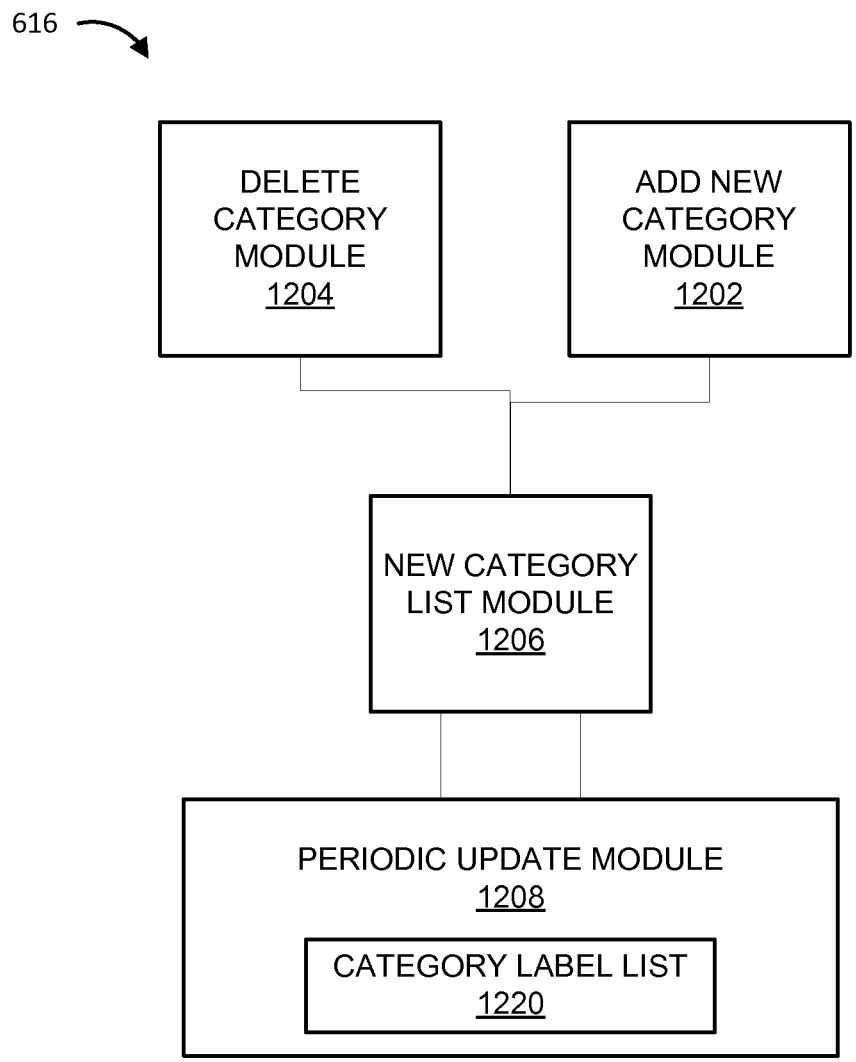
FIG. 12 shows a control flow of a category label return module of the navigation system.

Referring now to FIG. 12, therein is shown a control flow of a category label return module 616 of the navigation system 100. The category label return module 616 provides new category labels. The category label return module 616 includes add new category module 1202 which adds a new category label to the database module 508.

A delete category module 1204 can delete an existing category label which has not been used for a pre-determined period of time. The addition and deletion of category labels would result in a revised category label list, which is compiled by a new category list module 1206.

The new category list module 1206 is coupled to the delete category module 1204 and the create new category module 1202. The new category list module 1206 is also coupled to a periodic update module 1208. The category label list 1220 is updated from time to time by the periodic update module 1208 by executing the control flow depicted in FIG. 6.

Figure 13:
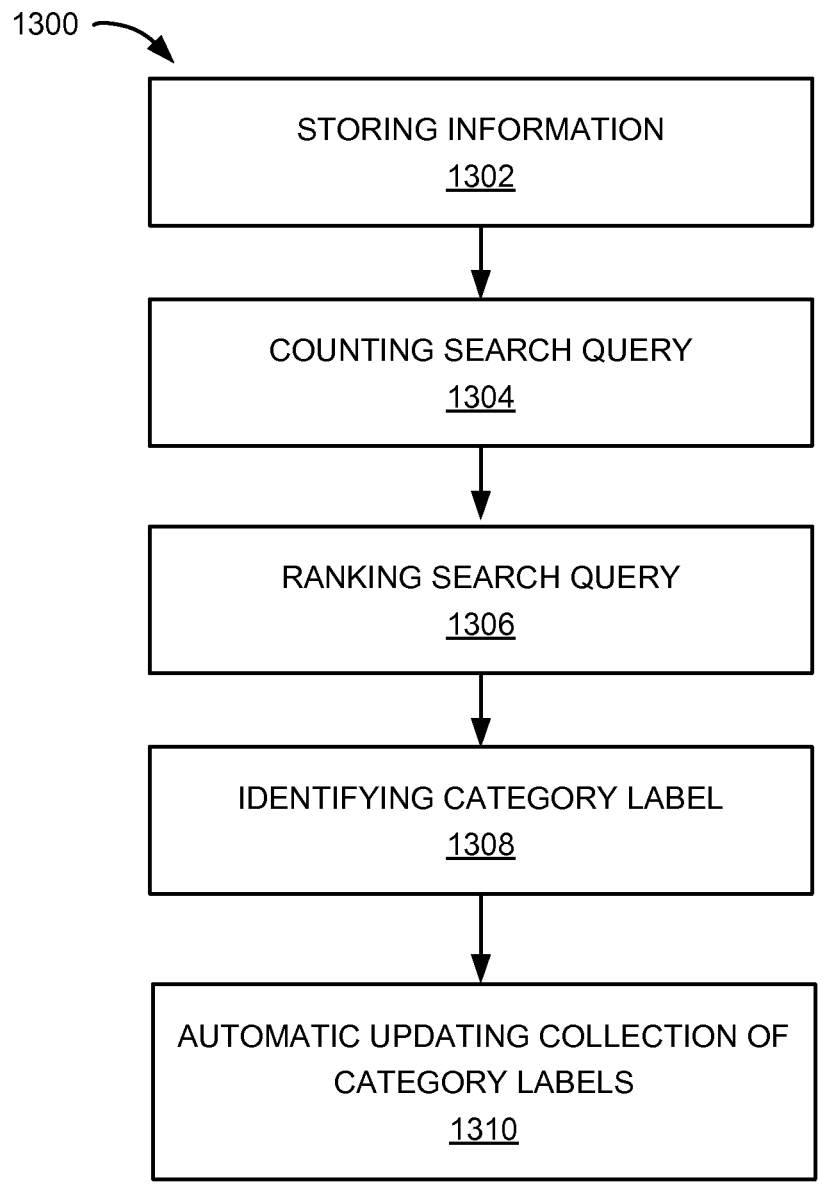
FIG. 13 shows a flow chart of a method of operation of the navigation system in a further embodiment of the present invention.

Referring now to FIG. 13, therein is shown a flow chart of a method 1300 of the navigation system 100 in a further embodiment of the present invention. The method 1300 includes: storing information relating to a plurality of search query 1302; counting each of the plurality of search query received 1304; ranking each of the plurality of search query based upon an aggregate count of each of the plurality of search query received 1306; identifying a category label based upon the ranking associated with each of the plurality of search query 1308; and updating a collection of category labels available to the navigational system 1310.

It has been discovered that creating category label from data extracted from search entries received by the navigation system allows information to be updated and organized in an automated manner. Point of interests searched by users change over time. Without an automatic mechanism to update category labels, a manual and complex process is required. Frequent updates would be more difficult due to higher complexity and longer manual process. Search records and search queries can be used to identify recent trends and interests of users for creating category labels or classification for points of interest.

It can be implemented in commercially available mobile devices, such as cell phones, laptop computers, and hand-held computing devices. It can also be implemented without requiring manual processing or software programs such as a web crawler. Specialized and additional software can take time and often requires additional manual processing, and it can be difficult to update over time. Thus, it has been discovered that the navigation system of the present invention furnishes important and heretofore unknown and unavailable solutions, capabilities, and functional aspects for updating category labels for points of interest based upon data from search queries and search records.

The physical transformation of search queries and search records to provide further routing and destination information results for a search query. As more data of search queries is collected in the physical world occurs, the navigational device can provide better direction or results to a vehicle when getting to a destination.

The navigation system 100 describes the module functions or order as an example. The modules can be partitioned differently. For example, the data logging module 504 in FIG. 5 can be integrated into the entry recognition module 506 in FIG. 5 or vice versa. The invention can be implemented in software, hardware or firmware. Each of the modules can operate individually and independently of the other modules.

The resulting method, process, apparatus, device, product, and/or system is straightforward, cost-effective, uncomplicated, highly versatile and effective, can be surprisingly and unobviously implemented by adapting known technologies, and are thus readily suited for efficiently and economically manufacturing navigation systems.

Another important aspect of the present invention is that it valuably supports and services the historical trend of reducing costs by automating process, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   storing information including to a plurality of search query;
   identifying similar ones of the plurality of search query by the control unit processing of the search query including comparing two of the plurality of search query to each other;
   counting each of the plurality of search query stored in the storage unit;
   ranking each of the plurality of search query based upon an aggregate count of each of the plurality of search query stored;
   identifying a category label based upon the ranking associated with each of the plurality of search query; and
   updating a category label list for displaying on a device including concurrently displaying a customer rating for each location, provided from the category label list, a current location, route information, for arriving at a selected location, and an alternative location from the category label list.

2. The method as claimed in claim 1 further comprising:
   creating the category label by associating with a higher ranking search query; and
   adding the category label.

3. The method as claimed in claim 1 further comprising:
   matching the category label to an existing category label; and
   adding the category label when the category label is distinct.

4. The method as claimed in claim 1 further comprising:
   updating a collection of category label.

5. The method as claimed in claim 1 wherein:
   identifying the category label associated with a lower ranking search query; and
   deleting the category label from a category label list.

6. The method of operation of a navigation system comprising:
   storing information including a point of interest data;
   identifying similar ones of the plurality of search query by the control unit processing of the search query including comparing two of the plurality of search query to each other;
   ranking the point of interest data received based upon an aggregate count of the point of interest data received by the communication unit during an identifiable time period;
   identifying a category label based upon the point of interest ranking; and
   updating a category label list by deleting the category label that has not been used for a particular period of time including displaying the update of the category label list on the device and concurrently displaying a customer rating, for each location provided from the category label list, a current location, route information, for arriving at a selected location, and an alternative location from the category label list.

7. A method as claimed in claim 6 further comprising:
   adding a category label associating with a higher ranking point of interest data stored.

8. The method as claimed in claim 6 further comprising:
   deleting a category label associated with a lower ranking point of interest data stored.

9. The method as claimed in claim 6 further comprising:
   iterating the storing information step, the ranking step, the identifying category label step, and the updating collection of category labels step.

10. The method as claimed in claim 6 further comprising:
    normalizing point of interest data stored for identifying distinct search query.

11. A navigation system comprising:
    a storage unit configured to store a plurality of search query;
    a control unit, coupled to the storage unit, configured to:
       identify similar ones of the plurality of search query including comparing two of the plurality of search query to each other,
       increment a count of each of the plurality of search query received by a communication interface,
       organize the plurality of search query based upon an aggregate count of each of the plurality of search query,
       determine a category label based upon the ranking associated with each of the plurality of search query, and
       revise a category label list, includes the category label that has not been used for a particular period of time deleted; and
    a user interface, coupled to the control unit, configured to display the category label list on a device includes a customer rating, for each location provided from the category label list, a current location, route information, for arriving at a selected location, and an alternative location from the category label list concurrently displayed on the device.

12. The system as claimed in claim 11 wherein the control unit is configured to:
generate a new category label associated with higher ranking search query; and
add the new category label to a category label list when the category label is distinct.

13. The system as claimed in claim 11 wherein the control unit is configured to:
compare the category label to an existing category label; and
add the category label to a plurality of existing category label when the category label is distinct.

14. The system as claimed in claim 11 wherein the control unit is configured to determine a periodic update for revising the category list.

15. The system as claimed in claim 11 wherein the control unit is configured to:
associate a category label with a lower ranking search query and deleting the category label from a category label list.

16. The system as claimed in claim 11 wherein the control unit is configured to:
execute a database module, a rank module, a category identification module, and a periodic update module from time to time.

17. The system as claimed in claim 16 wherein the control unit is configured to compare the two of the plurality of search query to each other to identify a distinct search query.

18. The system as claimed in claim 16 wherein the control unit is configured to provide further information of a result of a search query.

19. The system as claimed in claim 16 wherein the control unit is configured to:
identify the plurality of search query is a plurality of specific business names.

20. The system as claimed in claim 16 wherein the control unit is configured to identify the plurality of search query as a plurality of generic search query.

* * * * *